Dec. 20, 1927.

C. A. HOXIE

SIGNALING APPARATUS

Filed Feb. 20, 1922

1,653,099

Inventor:
Charles A. Hoxie,
by
His Attorney.

Patented Dec. 20, 1927.

1,653,099

UNITED STATES PATENT OFFICE.

CHARLES A. HOXIE, OF SCHENECTADY, NEW YORK, ASSIGNOR TO GENERAL ELECTRIC COMPANY, A CORPORATION OF NEW YORK.

SIGNALING APPARATUS.

Application filed February 20, 1922. Serial No. 537,802.

My present invention relates to signaling apparatus, and more particularly to apparatus for receiving and recording radio signals.

One of the objects of my invention is to provide a simple and effective apparatus for receiving and recording radio signals, particularly telegraphic signals of the continuous wave type.

A further object of my invention is to provide a receiving system for continuous wave telegraphic signals, which will not require the generation at the receiving station of any high frequency currents.

Still another object of my invention is to provide a receiving system whereby either an audible or visual indication of the received signals may be produced.

In carrying my invention into effect, I employ as one of the essential elements of my apparatus a light sensitive cell, that is, a current-carrying device, the current through which varies with the degree of illumination of the device. Preferably this device will be in the form of a photo-electric cell having a cathode of an alkaline metal such as sodium or potassium, and a cooperating anode enclosed in an evacuated receptacle. I employ in connection with this device a source of light which is so arranged that the illumination of the cell from the light source may be varied by means of the signaling currents to be received and recorded. In addition, I provide means for periodically interrupting the illumination of the cell at a predetermined constant rate for the purpose of producing an audio frequency component in the current through the cell.

Figure 1:
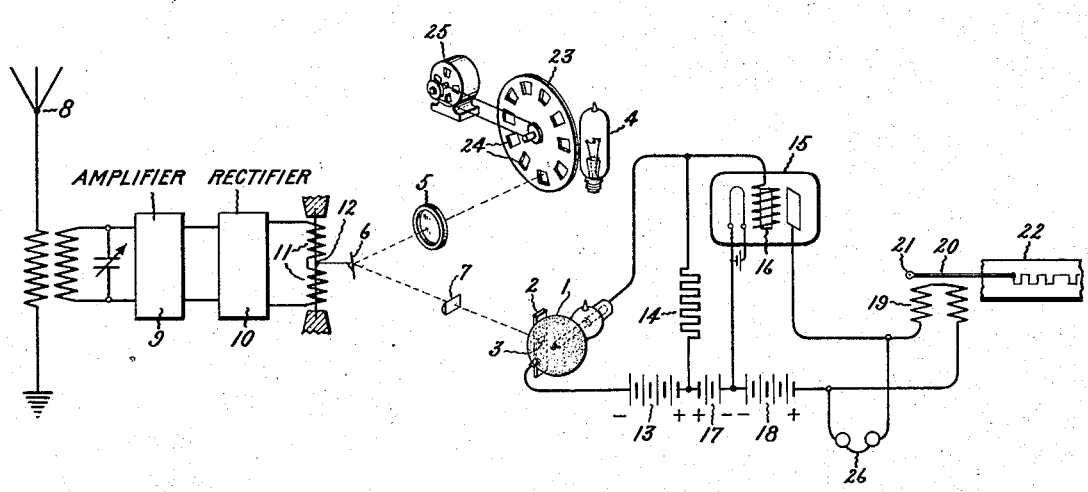
Figure 2:
Figure 3:

The novel features which I believe to be characteristic of my invention are set forth with particularity in the appended claims, my invention itself however both as to its organization and method of operation will best be understood by reference to the following description taken in connection with the accompanying drawing in which Fig. 1 indicates diagrammatically one way whereby my invention may be carried into effect, and Figs. 2 and 3 represent signal records made under two different methods of operating the apparatus.

As indicated in the drawing, I employ a light sensitive or photo-electric cell 1, the bulb of which is covered with some opaque medium except at one portion which is covered by a screen 2 having a slit or opening 3 therein. A light source 4 is so arranged that the light therefrom passing through a lens 5 falls upon a mirror 6 from which it may be reflected through another lens 7, upon the opening 3, and fall upon the light sensitive or photo-electric material within the cell.

The signals to be recorded may be received upon an antenna 8 and amplified by a suitable amplifier 9 and rectified or detected by any suitable form of detector 10. The rectified signaling current is caused to flow through the coils 11 of a sensitive galvanometer having a diaphragm 12, which is connected to the mirror 6. This galvanometer is preferably of the type described in my co-pending application, Serial No. 228,320, filed April 13, 1918. A circuit through the cell 1 includes a battery 13 and a non-inductive resistance 14. The resistance 14 is also included in the grid circuit of an electron discharge amplifier 15, the potential of the grid 16 of the amplifier being adjusted to its desired normal value by means of an extra battery 17. The output or plate circuit of the amplifier includes a battery 18 and the coils 19 of any suitable form of recording device. An armature 20, which is pivoted at 21, and which is actuated in any desired manner by the coils 19, carries at its other end a recording pen which makes a record of the received signals upon a moving tape 22.

When continuous waves are received by the apparatus thus far described a record may be made similar to that produced by the well known Morse recorder. It is usually desirable, however, for the purpose of adjusting the apparatus that an audible indication also be produced. In order to provide for this I employ a disk 23 having a plurality of openings 24 therein, which may be interposed between the light source 4 and the mirror 6, and revolved by means of a motor 25. If the disk 23 is rotated at such a speed that the light from source 4 is cut off from the cell 1 at a predetermined audible frequency the current through the cell and the current in the output circuit of the amplifier 15 will be caused to vary at an audible frequency thus causing the telephone receivers 26 to give an audible indication.

The apparatus which I have described may be operated in either of two different ways. The light source 4 and the reflecting apparatus may be so arranged that normally no light will fall on the cell. Then when a signal is received the mirror 6 will move and cause the light to fall upon the cell producing an increase in the current through the cell and also in the plate circuit of amplifier 15. As a result the armature 20 will be more strongly attracted and will remain thus attracted as long as the signal lasts. If the disk 23 is simultaneously rotated the signal will produce an audible response in the telephone receiver 26. The recording apparatus may be so arranged that the armature 20 will not be affected by reason of the audio frequency component thus produced in the current in the plate circuit.

When there is a considerable amount of static present, however, the record produced may have the general form shown in Fig. 2, the irregularities in the record being the result of static. To eliminate these irregularities to a large extent the apparatus may be so adjusted that normally the light falls on the cell and when a signal is received it is caused to be deflected from the cell. The signal will then be recorded as indicated in Fig. 3 by the change in current in the output circuit of the amplifier 15 between full normal illumination on the cell and no illumination and strong static impulses will have no effect as they will merely tend to throw the light farther away from the opening 3. In this case the signal as heard in the telephone receiver 26 will of course be inverted but the apparatus may be arranged so as to employ the first method during the original tuning and adjustment and it may then be quickly shifted to the second method.

While I have illustrated and described only one form of my invention, it will be apparent that many modifications in the form of apparatus employed and the arrangement thereof may be made without departing from the scope of my invention as set forth in the appended claims.

What I claim as new and desire to secure by Letters Patent of the United States, is:—

1. The combination in a signal recording apparatus of a source of light, a light sensitive cell, means for reflecting light from said source upon said cell, means for periodically interrupting the reflection of light upon said cell, a signal receiving apparatus, and means responsive to signaling currents produced therein for varying the amount of light falling upon said cell in response to the signals to be recorded.

2. The combination in a signal recording apparatus of a source of light, a light sensitive cell, means for reflecting light from said source upon said cell, means for periodically interrupting at an audible frequency the reflection of light upon said cell, a signal receiving apparatus, and means responsive to signaling currents produced therein for varying the amount of light falling upon said cell in response to the signals to be recorded.

3. The combination in a signal recording apparatus of a source of light, a light sensitive cell, means for reflecting light from said source upon said cell, means for periodically interrupting the reflection of light upon said cell, a signal receiving apparatus, means responsive to signaling currents produced therein for varying the amount of light falling upon said cell in response to the signals to be recorded, and means for utilizing the resultant variations in the current through the cell to produce a record of the signals.

4. The combination in a signal recording apparatus of a source of light, a light sensitive cell, means for reflecting light from said source upon said cell, means for periodically interrupting at an audible frequency the reflection of light upon said cell, a signal receiving apparatus, means responsive to signaling currents produced therein for varying the amount of light falling upon said cell in response to the signals to be recorded, and means for utilizing the resultant variation in the current through the cell to produce a record of the signals.

5. The combination in a signal recording apparatus of a source of light, a light sensitive cell, means for reflecting light from said source upon said cell, means for periodically interrupting the reflection of light upon said cell, a signal receiving apparatus, and means responsive to signaling currents produced therein for varying the amount of light falling upon said cell in response to the signals to be recorded, said apparatus being so adjusted that the light will be removed from the cell during the receipt of a signal.

6. The combination in a signal recording apparatus of a source of light, a light sensitive cell, means for reflecting light from said source upon said cell, a signal receiving apparatus, means responsive to signaling currents produced therein for varying the amount of light falling upon said cell in response to signals to be recorded, and means associated with the cell for producing an audible indication of the signals to be recorded.

7. The combination in a signal recording apparatus of a source of light, a light sensitive cell, means for reflecting light from said source upon said cell, means for varying the amount of light falling upon said cell in response to signals to be recorded, said apparatus being so adjusted that the light will be removed from the cell during the receipt of a signal, and means associated with the cell for producing an audible indication of the signals to be recorded.

8. The combination in a signal recording apparatus of a source of light, a light sensitive cell, means for reflecting light from said source upon said cell, a signal receiving apparatus, means responsive to signaling currents produced therein for varying the amount of light falling upon said cell in response to signals to be recorded, means for utilizing the resultant variations in the current through the cell to produce a record of signals, and means associated with the cell for producing an audible indication of the signals to be recorded.

9. The combination in a signal recording apparatus of a source of light, a light sensitive cell, means for reflecting light from said source upon said cell, means for varying the amount of light falling upon said cell in response to signals to be received, said apparatus being so adjusted that the light will be removed from the cell during the receipt of a signal, means for utilizing the resultant variations in the current through the cell to produce a record of the signals, and means associated with the cell for producing an audible indication of the signals to be recorded.

In witness whereof, I have hereunto set my hand this 18th day of February, 1922.

CHAS. A. HOXIE.